(12) United States Patent
Konishi et al.

(10) Patent No.: US 6,967,812 B2
(45) Date of Patent: Nov. 22, 2005

(54) MAGNETIC RECORDING/REPRODUCING DEVICE

(75) Inventors: Akio Konishi, Sanda (JP); Koichiro Hirabayashi, Hirakata (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 80 days.

(21) Appl. No.: 10/163,929

(22) Filed: Jun. 5, 2002

(65) Prior Publication Data
US 2002/0186499 A1    Dec. 12, 2002

(30) Foreign Application Priority Data
Jun. 12, 2001    (JP) .............................. 2001-176596

(51) Int. Cl.[7] ............................................. G11B 5/027
(52) U.S. Cl. ........................................ 360/85; 360/95
(58) Field of Search .............................. 360/83–85, 95, 360/130.21–130.23

(56) References Cited

U.S. PATENT DOCUMENTS

| | | | | |
|---|---|---|---|---|
| 4,582,235 A | * | 4/1986 | Schulz | 226/20 |
| 5,184,259 A | * | 2/1993 | Muller et al. | 360/85 |
| 5,305,162 A | * | 4/1994 | Kushiro et al. | 360/85 |
| 5,794,874 A | * | 8/1998 | Setsumasa et al. | 242/346.1 |
| 5,808,827 A | * | 9/1998 | Kumano et al. | 360/85 |
| 6,081,403 A | * | 6/2000 | Uetake et al. | 360/85 |
| 6,501,620 B1 | * | 12/2002 | Wojciechowski | 360/130.21 |

FOREIGN PATENT DOCUMENTS

| | | | |
|---|---|---|---|
| JP | 61 126658 | * | 6/1986 |
| JP | 63 317967 | * | 12/1988 |
| JP | 2001 052392 | * | 2/2001 |

* cited by examiner

Primary Examiner—Angel Castro
(74) Attorney, Agent, or Firm—Renner, Otto, Boisselle & Sklar, LLP (57) ABSTRACT

A magnetic recording/reproducing device of the present invention records information on or reproduces information from a tape provided in a cassette by winding the tape around a rotary head cylinder at a prescribed angle after the tape is drawn out from the cassette including a supply reel and a take-up reel by tape guide members. The device is characterized in that: a first tape guide member is located downstream in the tape running direction with respect to the supply reel; the first tape guide member is followed by a second tape guide member, a third tape guide member and the rotary head cylinder; and only the first tape guide member, the second tape guide member and the third tape guide member are provided between the supply reel and the rotary head cylinder.

6 Claims, 7 Drawing Sheets

Conventional Art

FIG. 9

Conventional Art

MAGNETIC RECORDING/REPRODUCING DEVICE

BACKGROUND OF THE INVENTION

1. Field of the Invention

The present invention relates to a magnetic recording/reproducing device which records information on or reproduces information from a tape provided in a cassette while winding the tape around a rotary head cylinder at a prescribed angle.

2. Description of the Related Art

Recently, magnetic recording/reproducing devices used for videotape recorders are becoming more compact and less expensive.

Referring to FIGS. 5 through 9, a conventional magnetic recording/reproducing device will be described below.

Figure 5:
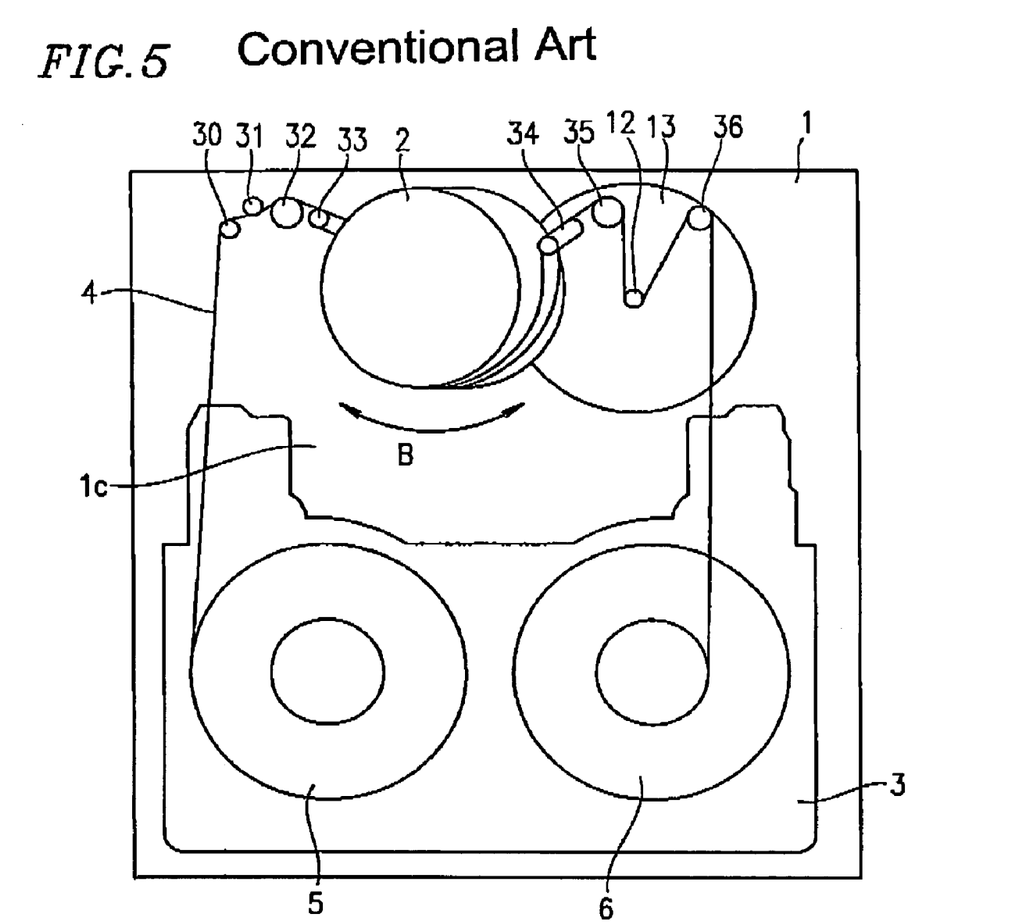
FIG. 5 is a top view of a conventional magnetic recording/reproducing device.
Figure 6:
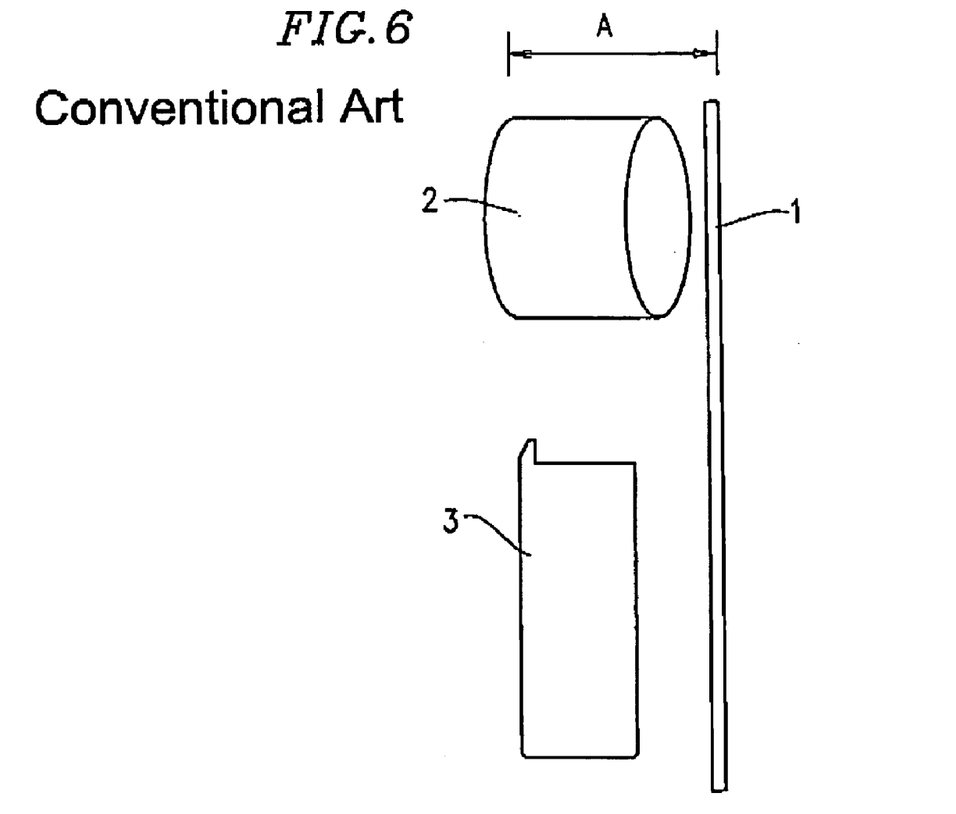
FIG. 6 is a side view of apart of the conventional magnetic recording/reproducing device of FIG. 5.
Figure 7:
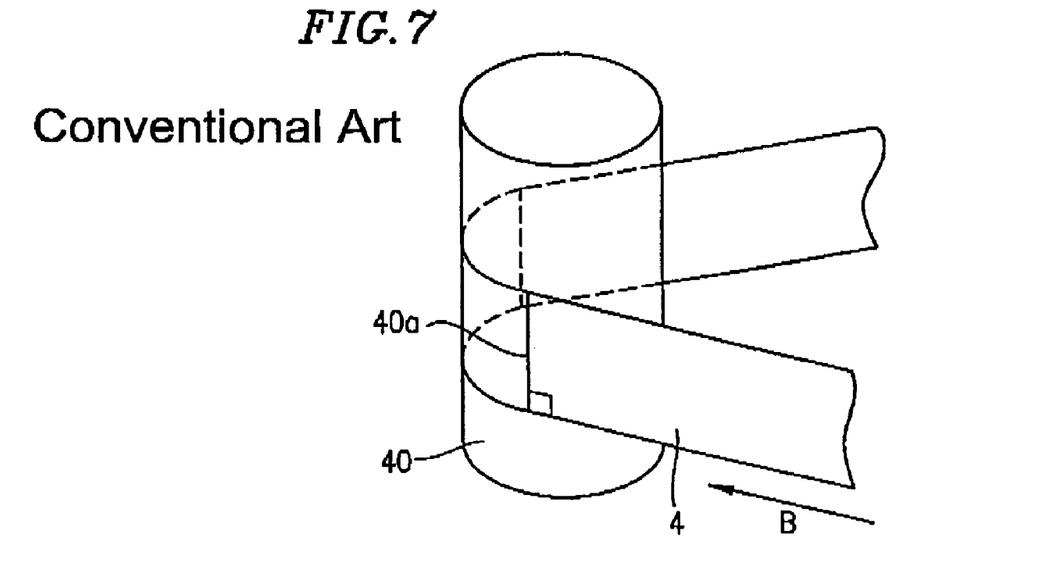
FIG. 7 is a perspective view of a vertical post of the conventional magnetic recording/reproducing device of FIG. 5.
Figures 8, 9:
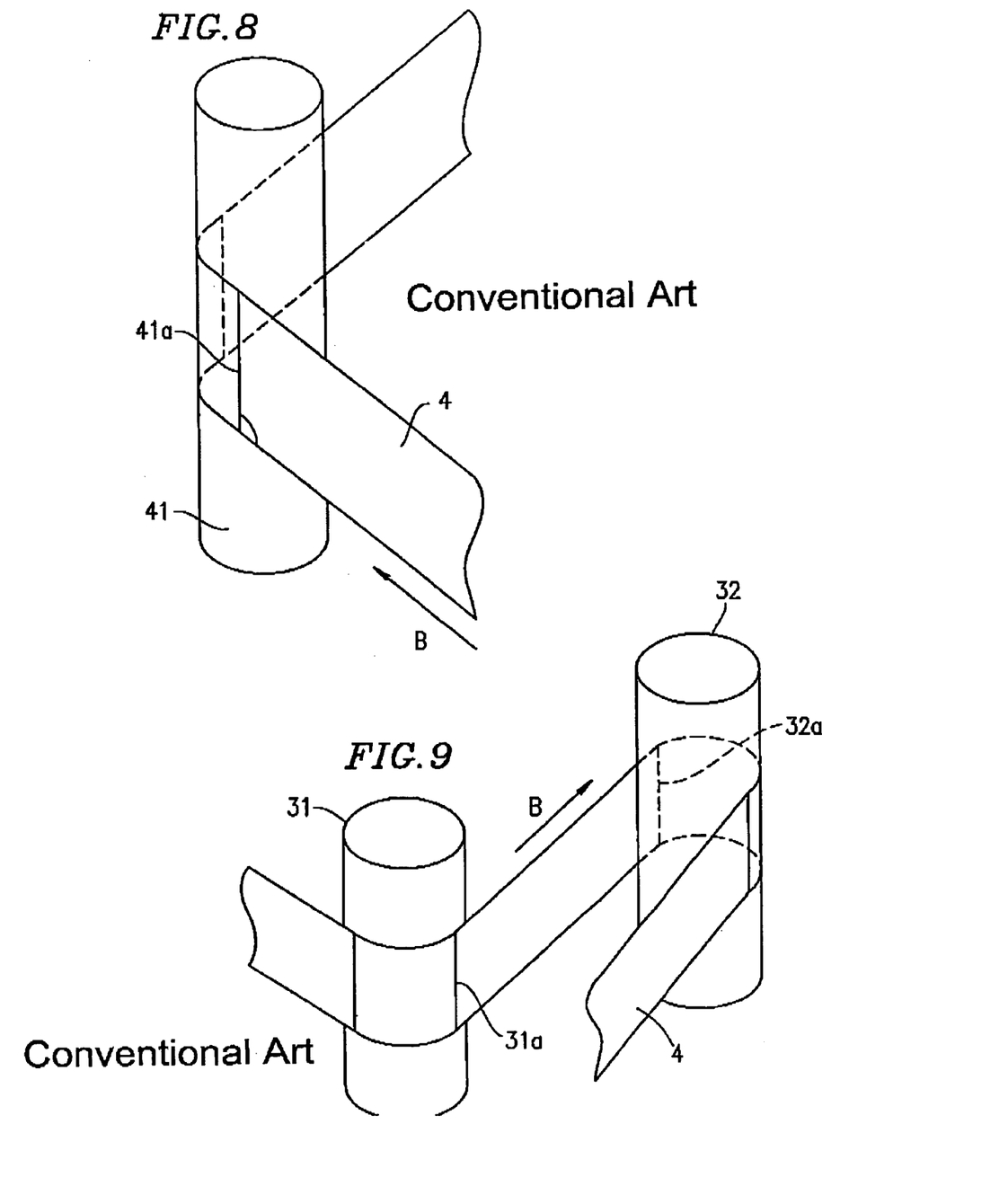
FIG. 8 is a perspective view of an inclined post of the conventional magnetic recording/reproducing device of FIG. 5.
FIG. 9 is a view showing a relationship of winding contact lines between posts of the conventional magnetic recording/reproducing device of FIG. 5.

FIG. 5 is a top view of a conventional magnetic recording/reproducing device. FIG. 6 is a side view of a part of the conventional magnetic recording/reproducing device of FIG. 5. FIG. 7 is a perspective view of a vertical post of the conventional magnetic recording/reproducing device of FIG. 5. FIG. 8 is a perspective view of an inclined post of the conventional magnetic recording/reproducing device of FIG. 5. FIG. 9 is a view showing a relationship of winding contact lines between posts of the conventional magnetic recording/reproducing device of FIG. 5.

In FIGS. 5 and 6, reference numeral 1 denotes a substrate, reference numeral 2 denotes a rotary head cylinder provided on the substrate 1 and reference numeral 3 denotes a cassette placed on the substrate 1. In FIG. 5, reference numeral 4 denotes a (magnetic) tape of the cassette 3. The tape 4 is wound on a supply reel 5 from one end of the tape 4 and is wound on a take-up reel 6 at the other end of the tape 4. The supply reel 5 and the take-up reel 6 are included in the cassette 3. Reference numerals 30, 31, 32, 33, 34, 35, 12 and 36 denote tape guide members for guiding the tape 4. The tape guide members include vertical posts (i.e., oriented in a perpendicular direction to the plane of the substrate 1) and inclined posts (i.e., oriented in an inclined direction to the plane of the substrate 1).

Referring to FIGS. 7 and 8, the definitions of the vertical post (vertical tape guide member) and the inclined post (inclined tape guide member) are described more specifically. FIG. 7 shows a case where the tape 4 is wound around a vertical post 40. In FIG. 7, arrow B denotes a running direction of the tape 4, which is shown in the other drawings so as to denote the same direction. It should be noted that although the tape 4 may run both the clockwise and counterclockwise directions around the rotary head cylinder 2 as shown by double-headed arrow B in FIG. 5 the tape running direction (B) described herein refers to the "clockwise direction". Reference numeral 40a denotes a winding contact line where the tape 4 is in contact with the vertical post 40. The winding contact line 40a is perpendicular to the tape running direction B. As in the case of the vertical post 40, when a winding contact line along which a tape contacts a tape guide member is perpendicular to the running direction of the tape, the tape guide member is defined as a vertical post.

FIG. 8 shows a case where the tape 4 is wound around an inclined post 41. In FIG. 8, reference numeral 41a denotes a winding contact line where the tape 4 is in contact with the inclined post 41. The winding contact line 41a is not perpendicular to the tape running direction B. As in the case of the inclined post 41, when a winding contact line along which a tape contacts a tape guide member is not perpendicular to the running direction of the tape, the tape guide member is defined as an inclined post.

Referring again to FIG. 5, reference numerals 30, 32, 33, 34, 35 and 36 respectively denote a first vertical post, a third vertical post, a first inclined post, a second inclined post, a fourth vertical post and a fifth vertical post which are located on the right side along the tape running direction B. Reference numerals 31 and 12 respectively denote a second vertical post and a vertical capstan post which are located on the left side along the tape direction B. Reference numeral 13 denotes a capstan motor section for rotationally driving the vertical capstan post 12. The first vertical post 30, the third vertical post 32, the first inclined post 33, the second inclined post 34, the fourth vertical post 35 and the fifth vertical post 36 are driven by a drive section (not shown) so as to draw out the tape 4 from the cassette 3 in a direction away from the cassette 3 and cause the tape 4 to be wound around the rotary head cylinder 2 at a prescribed angle. FIG. 5 shows a case where the tape 4 is wound around the rotary head cylinder 2 at a prescribed angle.

In FIG. 9, reference numeral 31a denotes a downstream, in the tape running direction B, winding contact line of the second vertical post 31, and reference numeral 32a denotes an upstream, in the tape running direction B, winding contact line of the third vertical post 32. The winding contact lines 31a and 32a are coplanar. The same applies to a relationship of winding contact lines between the first vertical post 30 and the second vertical post 31. That is, a downstream winding contact line of the first vertical post 30 and an upstream winding contact line of the second vertical post 31 are coplanar. The same applies to a relationship of winding contact lines between the following: the third vertical post 32 and the first inclined post 33; the second: inclined post 34 and the fourth vertical post 35; the fourth vertical post 35 and the vertical capstan post 12;

and the vertical capstan post 12 and the fifth vertical post 36. It should be noted that the illustrations (e.g., winding angles of the tape 4 with respect to the posts 31 is and 32) in FIG. 9 are exaggerated so as to clearly indicate winding contact line relationships between each of the posts.

However, in this conventional structure, the tape guide posts are arranged such that the respective winding contact lines are all coplanar, then an inclination of the rotary head cylinder 2 with respect to the substrate 1 is necessarily large so that reliable operation of recording/reproducing information to/from the tape 4 is provided, and thus, as shown in FIG. 6, a height A of the conventional magnetic recording/reproducing device which is defined by the rotary head cylinder 2 and the substrate 1 is also large. Further, in the conventional structure, as shown in FIG. 5, an area on the substrate 1 surrounded by the tape 4 after being drawn out from the cassette 3 and wound around the rotary head cylinder 2 (i.e., an area 1c is occupied so as to secure a tape running path) is large due to the relative locations of the tape guide posts 12 and 30 through 36 and the rotary head cylinder 2. Any other operational elements (e.g., a motor for driving the conventional magnetic recording/reproducing device) cannot be placed in the area 1c, since such elements prevent the tape 4 from being successfully drawn out from the cassette 3. This prevents the conventional magnetic recording/reproducing device from being reduced in size so as to provide a compact device. Furthermore, in this conventional structure, the tape 4 is drawn out from the cassette 3 by six tape guide members including the tape guide posts 30 through 36. Since the number of these tape guide members used for drawing out the tape 4 is not small, the mechanism of the conventional recording/reproducing device is complicated. This also prevents the conventional magnetic recording/reproducing device from being reduced in size.

SUMMARY OF THE INVENTION

According to one aspect of the present invention, there is provided a magnetic recording/reproducing device, in which information is recorded on or reproduced from a tape provided in a cassette by winding the tape around a rotary head cylinder at a prescribed angle after the tape is drawn out from the cassette including a supply reel and a take-up reel by tape guide members, the device is characterized in that: a first tape guide member is located downstream in the tape running direction with respect to the supply reel; the first tape guide member is followed by a second tape guide member, a third tape guide member and the rotary head cylinder; and only the first tape guide member, the second tape guide member and the third tape guide member are provided between the supply reel and the rotary head cylinder.

In one embodiment of this invention, when a winding contact line along which the tape contacts the tape guide member is perpendicular to the tape running direction, the tape guide member is defined as a vertical post, and when the winding contact line along which the tape contacts the tape guide member is not perpendicular to the tape running direction, the tape guide member is defined as an inclined post. The device is characterized in that: a first vertical post is located downstream with respect to the supply reel; the first vertical post is followed by a first inclined post, a Second vertical post and the rotary head cylinder; only the first vertical post, the first inclined post and the second vertical post are provided between the supply reel is and the rotary head cylinder: the first vertical post is located on the left side along the tape running direction; and the first inclined post and the second vertical post are located on the right side along the tape running direction.

In one embodiment of this invention, the magnetic recording/reproducing device is further characterized in that: a third vertical post in located downstream with respect to the rotary head cylinder, the third vertical post is followed by a second inclined post and a capstan post used for driving the tape; only the third vertical post and the second inclined post are provided between the rotary head cylinder and the capstan post; the third vertical post is located on the right side along the tape running direction; and the second inclined post and the capstan post are located on the left side along the tape running direction.

In one embodiment of this invention, the magnetic recording/reproducing device is further characterized in that a downstream winding contact line of the first inclined post and an upstream winding contact line of the second vertical post are not coplanar.

In one embodiment of this invention, the magnetic recording/reproducing device is further characterized in that: a downstream winding contact line of the third vertical post and an upstream winding contact line of the second inclined post are not coplanar; and a downstream winding contact line of the second inclined post and an upstream winding contact line of the capstan post are not coplanar.

In one embodiment of this invention, the device further includes a fourth vertical post located between the take-up reel and the capstan post, the fourth vertical post located on the right side along the tape running direction.

In one embodiment of this invention, only the first inclined post, the second vertical post, the third vertical post and the fourth vertical posts are operated to draw the tape from the cassette.

A magnetic recording/reproducing device of the present invention records information on or reproduces information from a tape included in a cassette by winding the tape around a rotary head cylinder at a prescribed angle after the tape is drawn out from the cassette including a supply reel and a take-up reel by tape guide members. The magnetic recording/reproducing device of the present invention is characterized in that: a first tape guide member is located downstream of the tape running direction with respect to the supply reel; the first tape guide member is followed by a second tape guide member, a third tape guide member and the rotary head cylinder: and only the first tape guide member, the second tape guide member and the third tape guide member are located between the supply reel and the rotary head cylinder.

With this structure of the present invention, it to possible to provide a compact magnetic recording/reproducing device in which an inclination of a rotary head cylinder with respect to a substrate is small, an area on the substrate surrounded by a tape after winding the tape around the rotary head cylinder (an area occupied for securing a tape running path) is small, and the number of tape guide members used for drawing out the tape from a cassette is small.

Thus, the invention described herein makes possible the advantages of providing a compact magnetic recording/reproducing device having a small inclination of the rotary head cylinder with respect to the substrate, having space provided on each side of the rotary head cylinder which may be used for placement of other operational elements, having a small area on the substrate surrounded by a tape after winding the tape around the rotary head cylinder is small, and having a small number of tape guide members used for drawing out the tape from the cassette.

These and other advantages of the present invention will become apparent to those skilled in the art upon reading and understanding the following detailed description with reference to the accompanying figures.

DESCRIPTION OF THE PREFERRED EMBODIMENTS

A magnetic recording/reproducing device according to the present invention records information on or reproduces information from a tape included in a cassette by winding the tape around a rotary head cylinder at a prescribed angle after the tape is drawn out from the cassette including a supply reel and a take-up reel by tape guide members. The magnetic recording/reproducing device of the present invention is characterized in that: a first tape guide member is located downstream of the tape running direction with respect to the supply reel; the first tape guide member is followed by a second tape guide member, a third tape guide member and the rotary head cylinder; and only the first tape guide member, the second tape guide member and the third tape guide member are located between the supply reel and the rotary head cylinder. Thus, it is possible to provide a compact and simple-structured magnetic recording/reproducing device in which the number of tape guide members located upstream with respect to the rotary head cylinder is small and the number of tape guide members, which are used for drawing out the tape from the cassette, located downstream with respect to the rotary head cylinder is small.

In the case where when a winding contact line along which a tape contacts a guide member is perpendicular to a tape running direction, the tape guide member is defined as a vertical post, and when the winding contact line along which a tape contacts a tape guide member is not perpendicular to the tape running direction, the tape guide member is defined as an inclined post. With such definitions, the magnetic recording/reproducing device according to the present invention is characterized in that: a first vertical post is located downstream with respect to the supply reel; the first vertical post is followed by a first inclined post, a second vertical post and the rotary head cylinder; only the first vertical post, the first inclined post and the second vertical post are located between the supply reel and the rotary head cylinder; the first vertical post is located on the left side along the tape running direction; and the first inclined post and the second vertical post are located on the right side along the tape running direction. In the present invention, an inclination of the rotary head cylinder with respect to the substrate is reduced, such that the thickness of the magnetic recording/reproducing device is reduced and space is provided in an area outside the tape running path on the left side of the rotary head cylinder, whereby it is possible to provide a magnetic recording/reproducing device in which an area on the substrate surrounded by the tape after winding the tape around the rotary head cylinder (i.e., an area occupied for securing the tape running path) is small.

The magnetic recording/reproducing device according to the present invention is further characterized in that: a third vertical post is located downstream in the tape running direction with respect to the rotary head cylinder; the third vertical post is followed by a second inclined post and a capstan post used for driving the tape; only the third vertical post and the second inclined post are located between the rotary head cylinder and the capstan post; the third vertical post is located on the right side along the tape running direction; and the second inclined post and the capstan post are located on the left side along the tape running direction. In the present invention, providing the magnetic recording/reproducing device with: the third vertical post on the right side along the tape running direction; the second inclined post on the left side along the tape running direction; and the capstan post used for driving the tape on the left side along the tape running direction, such that they are located downstream with respect to the rotary head cylinder, results in a small number of tape guide members being located downstream with respect to the rotary head cylinder and a small number of tape guide members used for drawing out the tape from the cassette located downstream with respect to the rotary head cylinder. Further, in the present invention, the reduction in the inclination of the rotary head cylinder with respect to the substrate (i.e., a (horizontal) plane of the magnetic recording/reproducing device) results in the thickness of the magnetic recording/reproducing device being further reduced. For example, the rotary head cylinder may have substantially no inclination such that the rotary head is oriented substantially perpendicular to the substrate. Furthermore, in the present invention, an inclination of the capstan post with respect to the substrate is reduced, such that a small thickness of the magnetic recording/reproducing device is provided and sufficient space is provided in an area outside of the tape running path on the right side of the rotary head cylinder (i.e., in a vicinity of the rotary head cylinder) whereby it is possible to provide a compact magnetic recording/reproducing device in which the area on the substrate surrounded by the tape after winding the tape around the rotary head cylinder is small and to provide sufficient space for other operational elements. For example, the capstan post may have substantially no inclination such that the capstan post is oriented substantially perpendicular to the substrate.

The magnetic recording/reproducing device according to the present invention is further characterized in that a downstream winding contact line of the first inclined post and an upstream winding contact line of the second vertical post are not coplanar. By further reducing the inclination of the rotary head cylinder with respect to the substrate, the thickness of the magnetic recording/reproducing device can be further reduced and space can be increased in the area outside the tape running path on the left side of the rotary head cylinder, whereby it is possible to provide a compact magnetic recording/reproducing device in which the area on the substrate surrounded by the tape after winding the tape around the rotary head cylinder is further reduced.

The magnetic recording/reproducing device according to the present invention is further characterized in that: a downstream, in the tape running direction, winding contact line of the third vertical post and an upstream winding contact line of the second inclined post are not coplanar; and a downstream winding contact line of the second inclined post and an upstream winding contact line of the capstan post are not coplanar. Such an arrangement further reduces the necessary inclination of the rotary head cylinder with respect to the substrate, such that the thickness of the magnetic recording/reproducing device is further reduced. Further, such an arrangement further reduces the necessary inclination of the capstan post with respect to the substrate, such that the thickness of the magnetic recording/reproducing device is further reduced and space in the area outside of the tape running path on the right side of the rotary head cylinder is increased, whereby it is possible to provide a compact magnetic recording/reproducing device in which the area on the substrate surrounded by the tape after winding the tape around the rotary head cylinder is further reduced.

Hereinafter, examples of the present invention will be described with reference to FIGS. 1 through 4.

EXAMPLE 1

Figure 1:
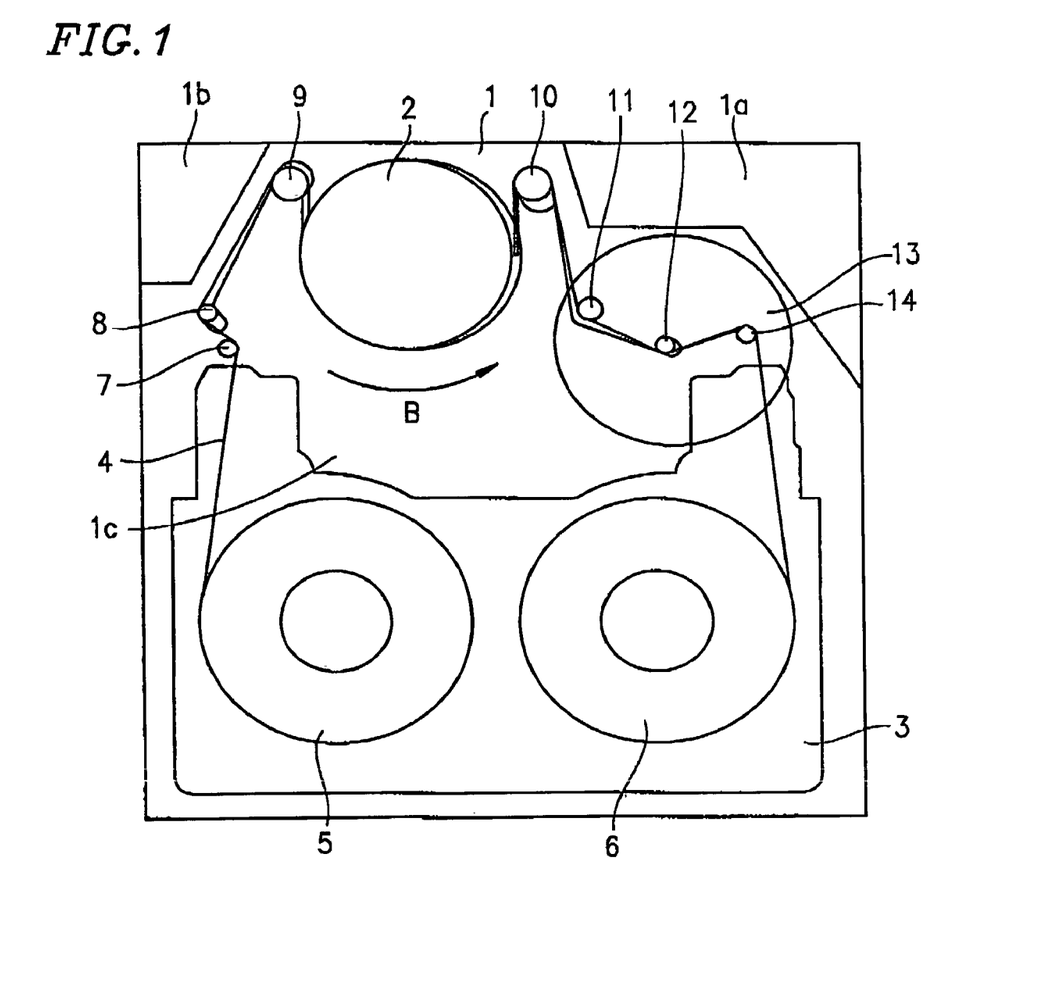
FIG. 1 is a top view of a magnetic recording/reproducing device according to Example 1 of the present invention.
Figure 2:
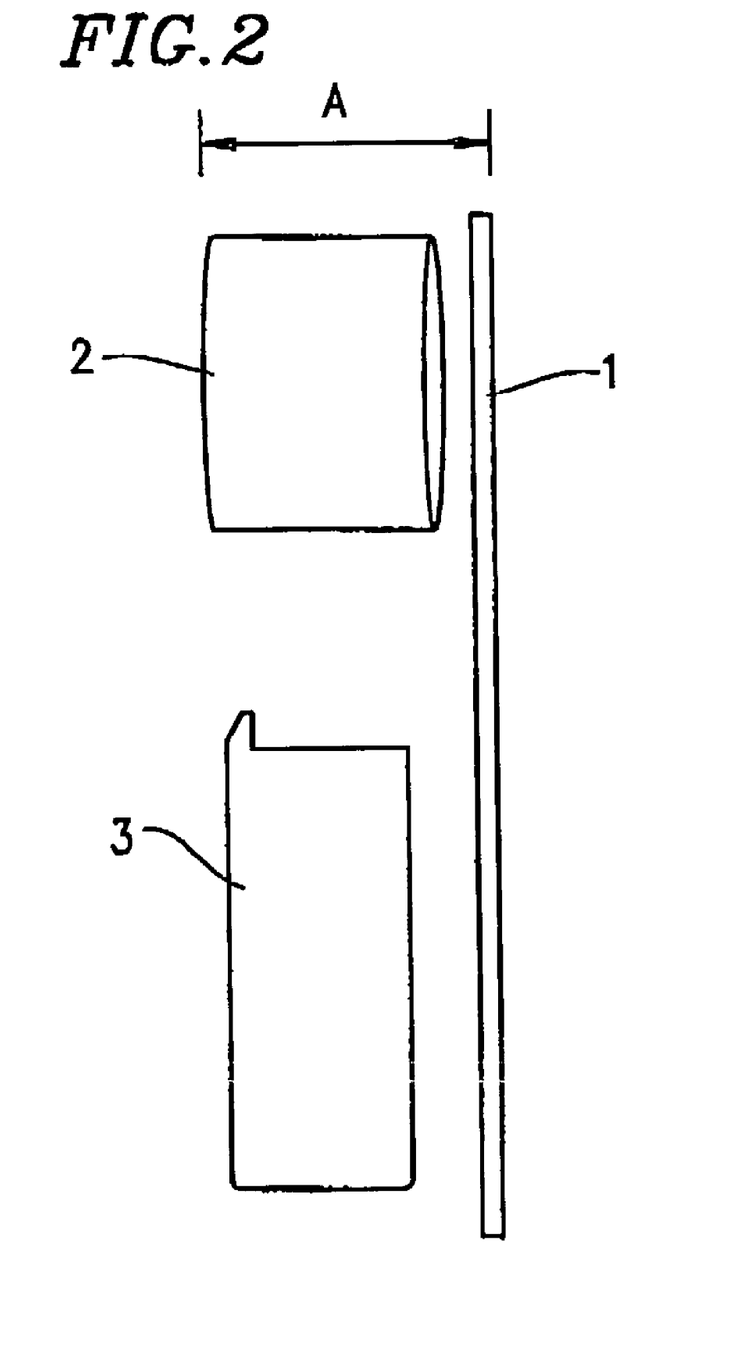
FIG. 2 is a side view of a part of the magnetic recording/reproducing device of FIG. 1.
Figure 3:
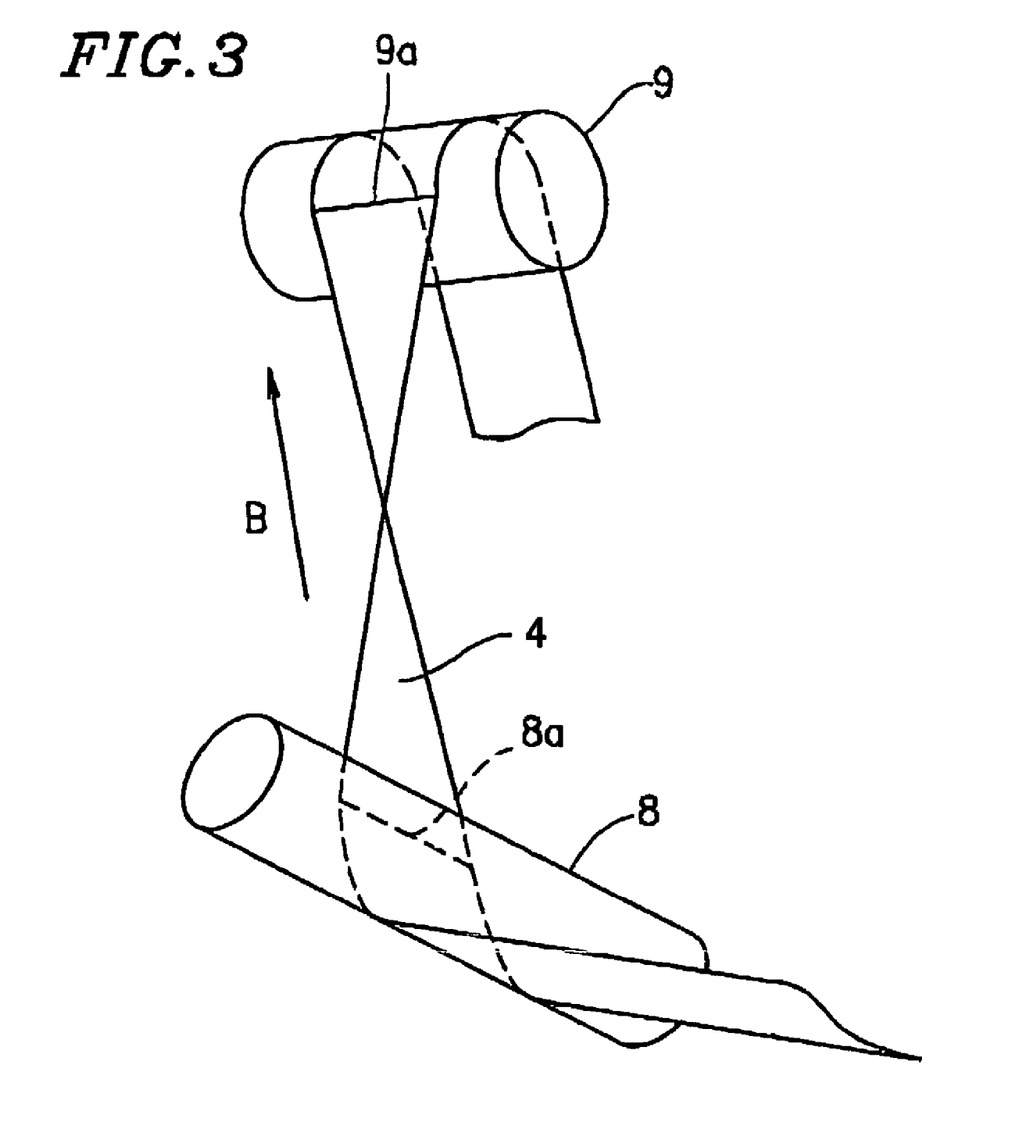
FIG. 3 is a perspective view showing a relationship of winding contact lines between posts of the magnetic recording/reproducing device of FIG. 1.
Figure 4:
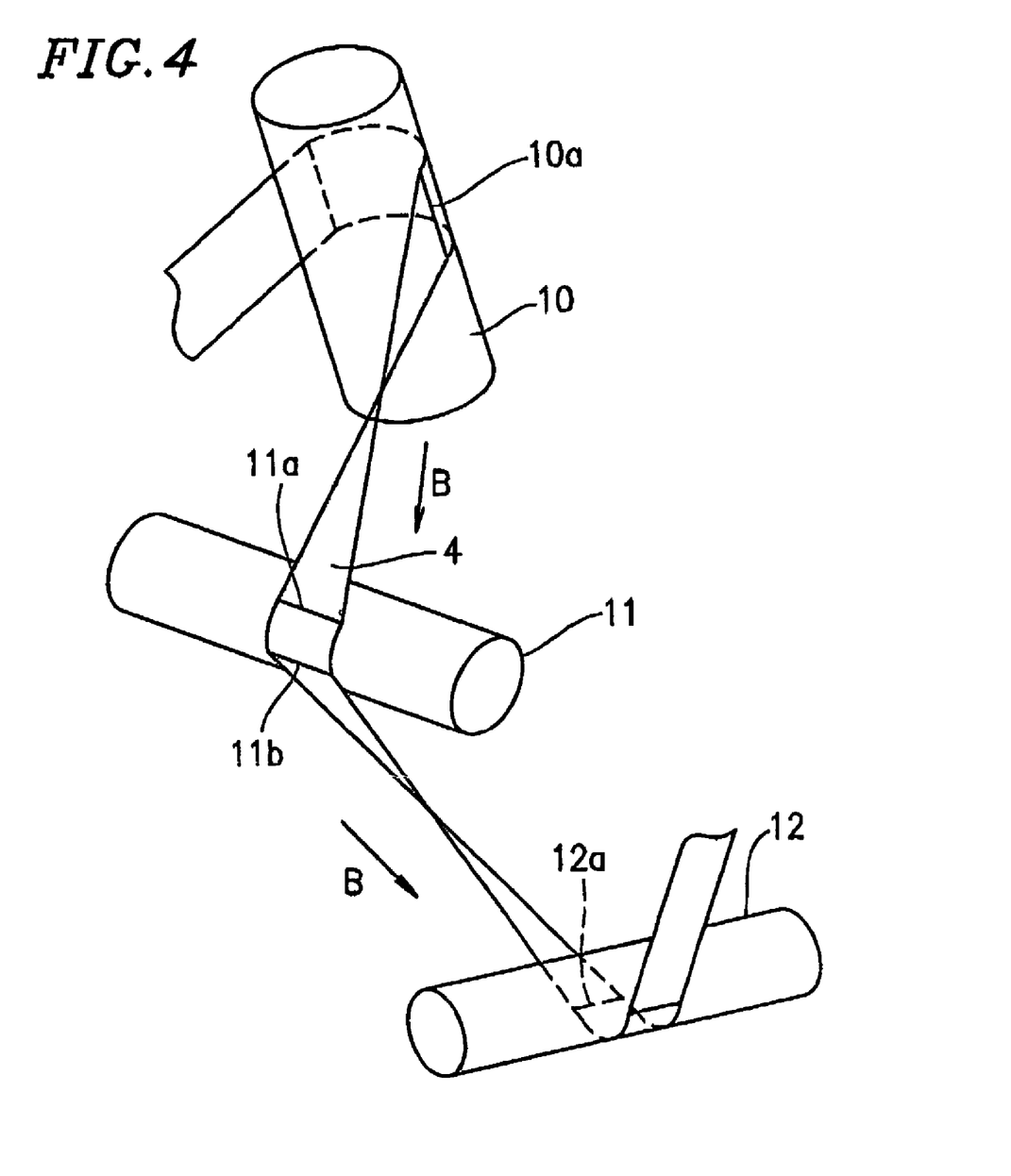
FIG. 4 is another perspective view showing a relationship of winding contact lines between posts of the magnetic recording/reproducing device of FIG. 1.

FIG. 1 is a top view of a magnetic recording/reproducing device according to Example 1 of the present invention, FIG. 2 is a side view of a part of the magnetic recording/reproducing device of FIG. 1, FIG. 3 is a view showing a relationship of winding contact lines between posts of the magnetic recording/reproducing device of FIG. 1, and FIG. 4 is another view showing a relationship of winding contact lines between posts of the magnetic recording/reproducing device of FIG. 1. In FIGS. 1 through 4, components having the same functions and the same names as those of components shown in FIGS. 5 through 9 are denoted by the same reference numerals.

In FIGS. 1 and 2, reference numeral 1 denotes a substrate, reference numeral 2 denotes a rotary head cylinder provided on the substrate 1, and reference numeral 3 denotes a cassette placed on the substrate 1. In FIG. 1, reference numeral 4 denotes a (magnetic) tape of the cassette 3. The tape 4 is wound on a supply reel 5 from one end of the tape 4 and is wound on a take-up reel 6 at the other end of the tape 4. The supply reel 5 and the take-up reel 6 are included in the cassette 3. Reference numerals 7, 8, 9, 10, 11, 12 and 14 denote tape guide members for guiding the tape 4. Similar to the aforementioned conventional magnetic recording/reproducing device, the tape guide members include vertical posts (i.e., oriented in a perpendicular direction to the plans of the substrate 1) and inclined posts (i.e., oriented in an inclined direction to the plane of the substrate 1). The definitions of the vertical post (vertical tape guide member) and the inclined post (inclined tape guide member) are the same as described in conjunction with the conventional magnetic recording/reproducing device. Reference numerals 7, 11 and 12 respectively denote a first vertical post, a second inclined post and a vertical capstan post which are located on the left side along the tape running direction B. The capstan post 12 is fixed on the substrate 1. Reference numerals 8, 9, 10 and 14 respectively denote a first inclined post, a second vertical post, a third vertical post and a fourth vertical post which are located on the right side along the tape running direction B. Reference numeral 13 denotes a capstan motor section for rotationally driving the vertical capstan post 12. The first inclined pest 8, the second vertical post 9, the third vertical post 10 and the fourth vertical post 14 are driven by a drive section (not shown) so as to draw out the tape 4 from the cassette 3 and cause the tape 4 to be wound around the rotary head cylinder 2 at a prescribed angle. FIG. 1 shows a case where the tape 4 is wound around the rotary head cylinder 2 at a prescribed angle.

In FIG. 3, reference numeral 8a denotes a downstream winding contact line of the first inclined post 8, and reference numeral 9a denotes an upstream winding contact line of the second vertical post 9. The winding contact lines 8a and 9a are not coplanar.

In FIG. 4, reference numeral 10a denotes a downstream winding contact line of the third vertical post 10, reference numeral 11a denotes an upstream winding contact line of the second inclined post 11, reference numeral 11b denotes a downstream winding contact line of the second inclined post 11, and reference numeral 12a denotes an upstream winding contact line of the vertical capstan post 12. The winding contact lines 10a and 11a are not coplanar and the winding contact lines 11b and 12a are also not coplanar. It should be noted that the illustrations (e.g., winding angles of the tape 4 with respect to the posts) in FIGS. 3 and 4 are exaggerated so as to clearly indicate winding contact line relationships between the posts.

As can be seen from the above description and the drawings, in Example 1 of the present invention, the first vertical post 7 is located downstream with respect to the supply reel 5 and is followed by the first inclined post 8, the second vertical post 9, and the rotary head cylinder 2 in this order. Only the first vertical post 7, the first inclined post 8, and the second vertical post 9 are provided between the supply reel 5 and the rotary head cylinder 2. The first vertical post 7 is located on the left side along the tape running direction be the first inclined post 8 is located on the right side along the tape running direction B, and the second vertical post 9 is located on the right side along the tape running direction B. The third vertical post 10 is located downstream, in the tape running direction B, with respect to the rotary head cylinder 2 and is followed by the second inclined post 11 and the vertical capstan post 12 for driving the tape 4. Only the third vertical post 10 and the second inclined post 11 are provided between the rotary head cylinder 2 and the vertical capstan post 12. The fourth vertical post 14 is located between the vertical capstan post 12 and the take-up reel 6. The third vertical post 10 and the fourth vertical post 14 are located on the right side along the tape running direction B. The second inclined post 11 and the vertical capstan post 12 are located on the left side along the tape running direction B. The downstream winding contact line 8a of the first inclined post 8 and the upstream winding contact line 9a of the second vertical post 9 are not coplanar. The downstream winding contact line 10a of the third vertical post 10 and the upstream winding contact line 11a of the second inclined post 11 are not coplanar. The downstream winding contact line 11b of the second inclined post 11 and the upstream winding contact line 12a of the vertical capstan post 12 are not coplanar. When these tape guide members are provided in the above-described manner, as shown in FIG. 1, an area on the substrate 1 surrounded by the tape 4 after being drawn out from the cassette 3 to be wound around the rotary head cylinder 2 (i.e., an area 1c occupied for securing a tape running path) is small. As a result, spaces 1a and 1b (shown in FIG. 1) are provided at either side of the rotary head cylinder 2 in an area outside of the tape running path, whereby it is possible to reduce the size of the magnetic recording/reproducing device according to Example 1 of the present invention.

Further, by arranging the tape guide members in the above-described manner so that a number of the tape guide members have winding contact lines which are not coplanar, it is possible to reduce an inclination of the rotary head cylinder 2 with respect to the substrate 1 while providing reliable operation of recording/reproducing information to/from the tape 4, and as such to reduce the height A (shown in FIG. 2) of the magnetic recording/reproducing device defined by the rotary head cylinder 2 and the substrate 1, whereby it is possible to reduce the thickness of the magnetic recording/reproducing device.

Furthermore, an in the case of the rotary head cylinder 2 by arranging the tape guide members in the above-described manner, it is possible to reduce an inclination of the vertical capstan post 12 with respect to the substrate 1 and a height of the magnetic recording/reproducing device defined by the vertical capstan post 12, the capstan motor section 13 and the substrate 1, whereby it is possible to further reduce the thickness of the magnetic recording/reproducing device.

Further still, the number of the tape guide members used in the entire device is small and the number of the tape guide members used for drawing out the tape 4 from the cassette 3 is only four (i.e., the first inclined post 8, the second vertical post 9, the third vertical post 10 and the fourth vertical post 14), rather than six as in the conventional arrangement, and thus it is possible to simplify the mechanism and reduce the size of the magnetic recording/reproducing device.

Although a relationship of winding contact lines between the first vertical post 7 and the first inclined post 8 has not been described above, the downstream winding contact line of the first inclined post 8 and the upstream winding contact line of the first inclined post 8 may or may not be coplanar, where either arrangement produces the above-described advantageous effects of the present invention.

Further, although a relationship of winding contact lines between the supply reel 5 and the first vertical post 7 has not been described above, the downstream winding contact line of the supply reel 5 and the upstream winding contact line of the first vertical post 7 may or may not be coplanar, where either arrangement produces the above-described advantageous effects of the present invention.

Furthermore, although a relationship of winding contact lines between the second vertical post 9 and the rotary head cylinder 2 has not been described above, the downstream winding contact line of the second vertical post 9 and the upstream winding contact line of the rotary head cylinder 2 may or may not be coplanar, where either arrangement produces the above-described advantageous effects of the present invention.

Further still, although a relationship of winding contact lines between the rotary head cylinder 2 and the third vertical post 10 has not been described above, the downstream winding contact line of the rotary head cylinder 2 and the upstream winding contact line of the third vertical post 10 may or may not be coplanar, where either arrangement produces the above-described advantageous effects of the present invention.

Further still, although a relationship of winding contact lines between the capstan post 12 and the fourth vertical post 14 has not been described above, the downstream winding contact line of the capstan post 12 and the upstream winding contact line of the fourth vertical post 14 may or may not be coplanar, where either arrangement produces the above-described advantageous effects of the present invention.

Further still, although a relationship of winding contact lines between the fourth vertical post 14 and the take-up reel 6 has not been described above, the downstream winding contact line of the fourth vertical post 14 and the upstream winding contact line of the take-up reel 6 may or may not be coplanar, where either arrangement produces the above-described advantageous effects of the present invention.

As described above, according to the present invention, it is possible to provide a compact magnetic recording/reproducing device in which an inclination of a rotary head cylinder with respect to a substrata is small, an area on the substrate surrounded by a tape after being wound around the rotary head cylinder (an area occupied for securing a tape running path) is small, and the number of tape guide members used for drawing out the tape from the cassette is small.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A magnetic recording/reproducing device, wherein information is recorded on or reproduced from a tape provided in a cassette by winding the tape around a rotary head cylinder at a prescribed angle after the tape is drawn out from the cassette, which includes a supply reel and a take-up reel, by tape guide members, and wherein when a winding contact line along-which the tape contacts a tape guide member is perpendicular to the tape running direction, the tape guide member is defined as a vertical post, and when the winding contact line along which the tape contacts the tape guide member is not perpendicular to the tape running direction, the tape guide member is defined as an inclined post, the device characterized in that;

a first vertical post is located downstream with respect to the supply reel;

the first vertical post is followed by a first inclined post, a second vertical post and the rotary head cylinder;

only the first vertical post, the first inclined post and the second vertical post are provided between the supply reel and the rotary head cylinder;

the first vertical post is located on a left side along the tape running direction; and the first inclined post and the second vertical post are located on a right side along the tape running direction.

2. A magnetic recording/reproducing device according to claim 1, characterized in that:

a third vertical post is located downstream with respect to the rotary head cylinder;

the third vertical post is followed by a second inclined post and a capstan post used for driving the tape;

only the third vertical post and the second inclined post are provided between the rotary head cylinder and the capstan post;

the third vertical post is located on the right side along the tape running direction; and the second inclined post and the capstan post are located on the left side along the tape running direction.

3. A magnetic recording/reproducing device according to claim 2, characterized in that:

a downstream winding contact line of the third vertical post and an upstream winding contact line of the second inclined post are not coplanar, and a downstream winding contact line of the second inclined post and an upstream winding contact line of the capstan post are not coplanar.

4. A magnetic recording/reproducing device according to claim 2, wherein the device further includes a fourth vertical post located between the take-up reel and the capstan post, the fourth vertical post located on the right side along the tape running direction.

5. A magnetic recording/reproducing device according to claim 4, wherein only the first inclined post, the second vertical post, the third vertical post and the fourth vertical post are operated to draw the tape from the cassette.

6. A magnetic recording/reproducing device according to claim 2, characterized in that a downstream winding contact line of the first inclined post and an upstream winding contact line of the second vertical post are not coplanar.

* * * * *